United States Patent
Cotton et al.

(10) Patent No.: US 11,828,413 B2
(45) Date of Patent: Nov. 28, 2023

(54) GREASE PRESSURE RELIEF SYSTEM

(71) Applicant: Patriot Research Center, LLC, Houston, TX (US)

(72) Inventors: Craig Cotton, Cypress, TX (US); Manish Agarwal, Cypress, TX (US); Joseph Opitz, Wellington, CO (US)

(73) Assignee: Patriot Research Center, LLC, Houston, TX (US)

( * ) Notice: Subject to any disclaimer, the term of this patent is extended or adjusted under 35 U.S.C. 154(b) by 245 days.

(21) Appl. No.: 17/328,444

(22) Filed: May 24, 2021

(65) Prior Publication Data

US 2022/0373132 A1    Nov. 24, 2022

(51) Int. Cl.
| | |
|---|---|
| *F16K 15/18* | (2006.01) |
| *F16N 23/00* | (2006.01) |
| *F16K 1/14* | (2006.01) |
| *F16K 17/10* | (2006.01) |
| *F16K 17/04* | (2006.01) |
| *F16K 3/18* | (2006.01) |
| *F16K 3/02* | (2006.01) |

(52) U.S. Cl.
CPC ............ *F16N 23/00* (2013.01); *F16K 1/14* (2013.01); *F16K 15/1823* (2021.08); *F16K 15/1826* (2021.08); *F16K 17/0406* (2013.01); *F16K 17/10* (2013.01); *F16K 3/029* (2013.01); *F16K 3/0281* (2013.01); *F16K 3/188* (2013.01)

(58) Field of Classification Search
CPC ........ F16N 23/00; F16K 1/14; F16K 17/0406; F16K 17/10; F16K 3/0281; F16K 3/029; F16K 3/188; F16K 3/36; F16K 15/1826; F16K 15/182; E21B 34/02; Y10T 137/44–4442; Y10T 137/4379
See application file for complete search history.

(56) References Cited

U.S. PATENT DOCUMENTS

| | | | | |
|---|---|---|---|---|
| 2,068,810 A | * | 1/1937 | McCausland | F16K 3/36 137/246.22 |
| 2,951,497 A | * | 9/1960 | Laurent | F16K 3/36 137/246.22 |
| 4,338,981 A | * | 7/1982 | Frauenberger | F16K 15/044 141/85 |
| 5,598,902 A | * | 2/1997 | Lin | F16N 11/04 184/45.1 |

(Continued)

*Primary Examiner* — Marina A Tietjen
(74) *Attorney, Agent, or Firm* — Ramey LLP

(57) ABSTRACT

A check valve bleed assembly eliminates the requirement for a person to enter the red zone when bleeding the grease out of a gate or other valve. A gas or other fluid is provided to the check valve bleed assembly. The gas or other fluid acts upon the surface driving a pin into the associated check valve with sufficient force to overcome the resistance of the object sitting on a seat and moves the object off of the seat. The force is maintained as long as is necessary. Usually, the check valve is held open until the gate transitions into the gate's associated gate recess thereby displacing the grease within the gate recess through the check valve, into the check valve bleed assembly, and finally to a waste collection tube. In some embodiments a gate valve greasing access port is included in the check valve bleed assembly such that grease may be injected into the check valve bleed assembly.

1 Claim, 5 Drawing Sheets

(56) References Cited

U.S. PATENT DOCUMENTS

| | | | |
|---|---|---|---|
| 2002/0129855 A1* | 9/2002 | Weiler, Jr. | C03B 9/406 |
| | | | 137/596 |
| 2018/0180189 A1* | 6/2018 | Bell | F15B 13/0401 |
| 2020/0018439 A1* | 1/2020 | Harrel | F16N 23/00 |

* cited by examiner

GREASE PRESSURE RELIEF SYSTEM

BACKGROUND

A typical oil and gas well generally includes a wellhead with a frack tree at the surface. The frack tree, in turn, generally consists of one or more large bore gate valves that allow pumping high-pressure fluids, including proppant, into the wellbore. High-pressure fluid, when injected into a hydrocarbon bearing formation, causes fissures in the formation rock that radiate out from the wellbore. However, when the high-pressure fluid is removed the fissures close. When proppant, generally sand, is injected into the formation along with the high-pressure fluid then as the fissures are formed, proppant is also forced into the fissures. When the pressure is removed from the fluid within the fissures, the proppant remains within the fissures. Generally, the proppant has a relatively small diameter in order to be carried into the fissures and has a relatively high compressive strength such that when the pressure is removed the proppant that remains within the fissures prevents the fissures from closing. The fissures are then able to provide channels for fluids to move from the formation into the wellbore. Material such as sand and ground walnut shells are commonly used.

Today a single well may see 40 or more pumping cycles in order to fracture each hydrocarbon bearing formation within the well. A typical frack job may require over 10 million barrels of water and several hundred thousand pounds of proppant. During the frack job, all valves that are downstream of the frack pumps such as the frack tree valves, as well as other devices having gate valves such as the zipper manifolds are set to full flow to allow the high pressure frack fluid to move through the valves. While the operator is pumping the high-pressure frack fluid the sand laden fluid is forced into every opening from the top of the frack tree to the bottom of the well including any nooks or crannies in the large bore valves that make up the frack tree.

Generally, the large bore valves are gate valves. Each of the gates sits between a pair of seats. When the gate transits between an open and closed position the gate floats between each of the seats. When a gate is closed pressurized fluid will push against the gate causing the gate to land on the seat on the opposite side of the pressurized fluid. When the gate lands on the seat a seal is formed to prevent fluid flow past the gate and seat. However, on the side of the gate towards the fluid there is a gap between the seat and the gate.

This gap allows pressurized fluid to flow around the gate and into the space where the gate moves when transits between open or closed. The pressurized fluid is generally proppant laden therefore the proppant moves with the fluid into the spaces behind the gate. In order to keep the valves operable as long as possible grease is applied to the valve in an effort to push the proppant out of the valves' nooks and crannies and in particular the areas behind the gate.

Generally, the grease very viscous and may be also be used in an attempt to prolong the gate seat seals to prevent leaking allowing a proppant damaged valve to continue to operate at some degraded capacity until it reaches a point at which it must be replaced.

Finally, the grease is an incompressible fluid and has been pumped into the cavities behind the gate into which the gate must move in order to open or close the valve. Due to the viscosity and incompressibility of the grease the gate must be opened or closed very slowly to allow the grease to move into the wellbore through the very small gaps between the seat and gate. To speed up the operation a bleed port is provided from the gate cavity to the exterior of the gate valve to allow the grease to move out of the gate cavities. However, in current gate valves the bleed port has a plug to prevent fluid loss during valve operation. The plug currently requires a person to enter the red zone to open the plug and port thereby allowing the grease to escape from the relevant cavity as the gate moves into the cavity. Unfortunately, a manual bleed port does not provide a flow path for the grease to be contained therefore at least a portion of the grease may escape containment thereby contaminating the soil around the well site. Additionally, the red zone is a hazardous area where flammable materials, toxic gases, and high-pressure fluids may be present. During operation no one may enter the red zone for any purpose. Therefore, in order to access the bleed port on a gate valve fracking operations must be shut down for any period of time that a person is required to be in the red zone.

SUMMARY

In an embodiment of the current invention a gate valve is provided with a remotely actuated bleed system. A gate valve includes at least one cavity for the gate to recess into when the valve is opened. In some instances, the gate valve may have 2 cavities one for a portion of the gate to recess into when the gate opens and another for the gate to recess into when the gate closes. In any event, a port is provided such that when the gate moves into the cavity the contents of the cavity may exit the cavity through the port. In this instance the port is provided with a check valve. In general, a check valve permits one way fluid past the valve such that fluid flow in one direction tends to force the check valve closed while fluid flow in the opposite direction tends to force the check valve open. In certain instance such as those contemplated in the present invention a rod or other device may prevent a check valve from closing or open the check valve in the presence of fluid flow that would otherwise close the check valve. Where the check valve is oriented so that in normal operation the contents of the cavity are prevented from exiting through the check valve while fluid or grease may proceed through the check valve into the cavity. Additionally, the check valve is provided with a remotely actuated piston. The piston provides sufficient force to drive the check dart off of its seat in opposition to the contents of the gate cavity providing force to drive the check dart into its seat. The piston may be actuated pneumatically or hydraulically and is generally linked to the check dart by a rod. In certain instances, the piston may be done away with and the rod driven electrically either directly or by geared motor. With the piston actuated and the check dart off of its seat the contents of the gate cavity may move past the piston through the seat and out of the gate valve including the remotely actuated bleed system. Additionally, by providing a contained pathway for the contents of the gate cavity, the contents of the gate cavity may be directed through tubing to a container which may be safely removed from the well site thereby preventing additional soil contamination.

DETAILED DESCRIPTION

The description that follows includes exemplary apparatus, methods, techniques, or instruction sequences that embody techniques of the inventive subject matter. However, it is understood that the described embodiments may be practiced without these specific details.

Figure 1:
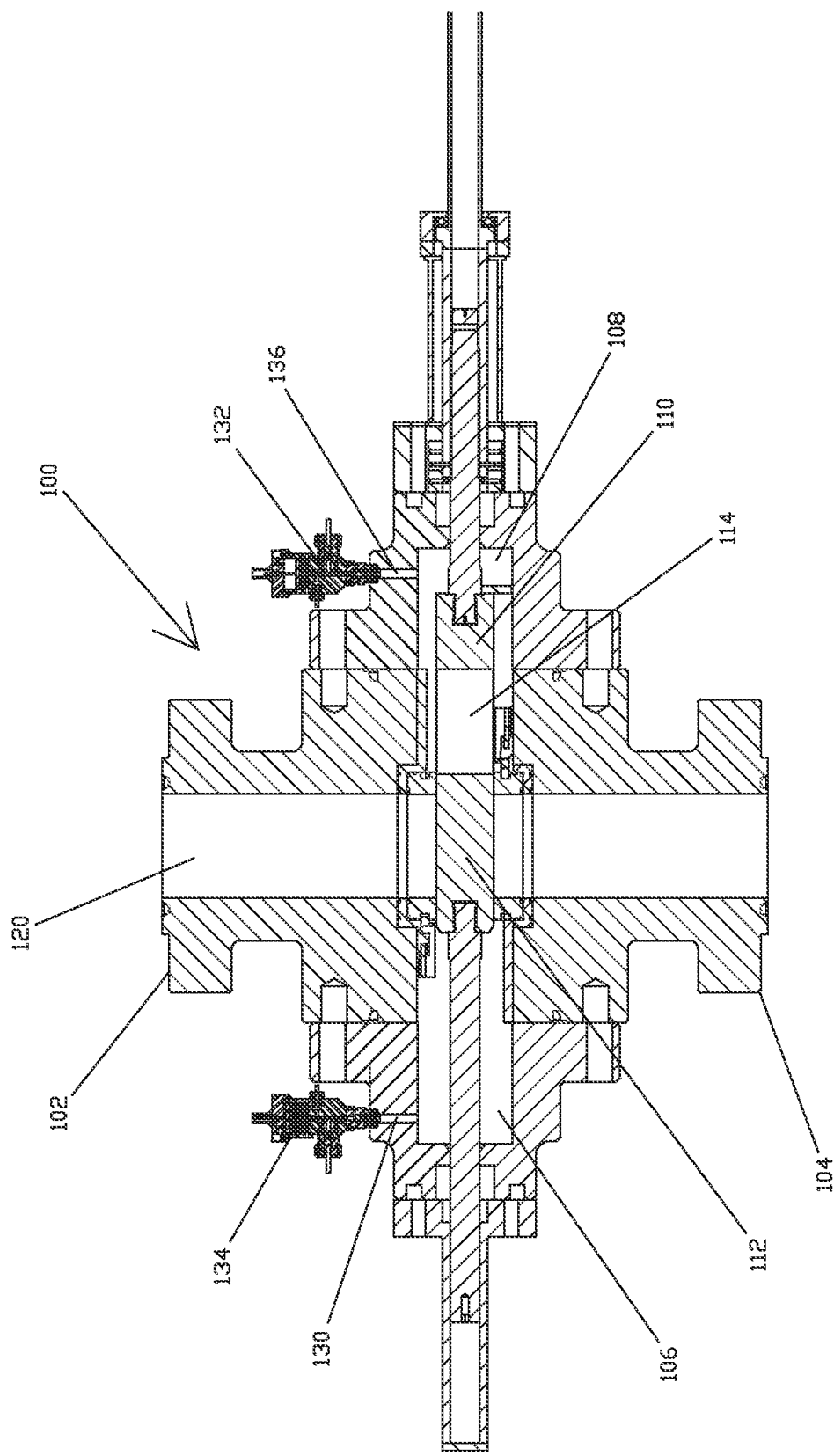
FIG. 1 is a side view of a gate valve having a check valve bleed assembly where the gate prevents fluid access through the gate valve throughbore.

FIG. 1 is a representation of an embodiment of the current invention. A gate valve 100 includes gate 110. Gate 110 has a blocking portion 112 and open portion 114. The gate valve 100 has an upper end 102 and a lower end 104. Additionally, gate valve 100 includes a $1^{st}$ gate cavity 106 and a $2^{nd}$ gate cavity 108. As shown, the gate 100's blocking portion 112 sits across throughbore 120 preventing fluid access through throughbore 120 between the upper end 102 of the gate valve 100 and the lower end 104 of the gate valve 100. Gate valve 110 is positioned within the $2^{nd}$ gate cavity 108. The gate valve 100 also includes a $1^{st}$ bleed port 130 and a $2^{nd}$ bleed port 132. The $1^{st}$ bleed port 130 and the $2^{nd}$ bleed port 132 are each provided with a check valve bleed assembly 134 and 136 respectively. Generally, the $1^{st}$ gate cavity 106 and the $2^{nd}$ gate cavity 108 are filled with grease.

Figure 2:
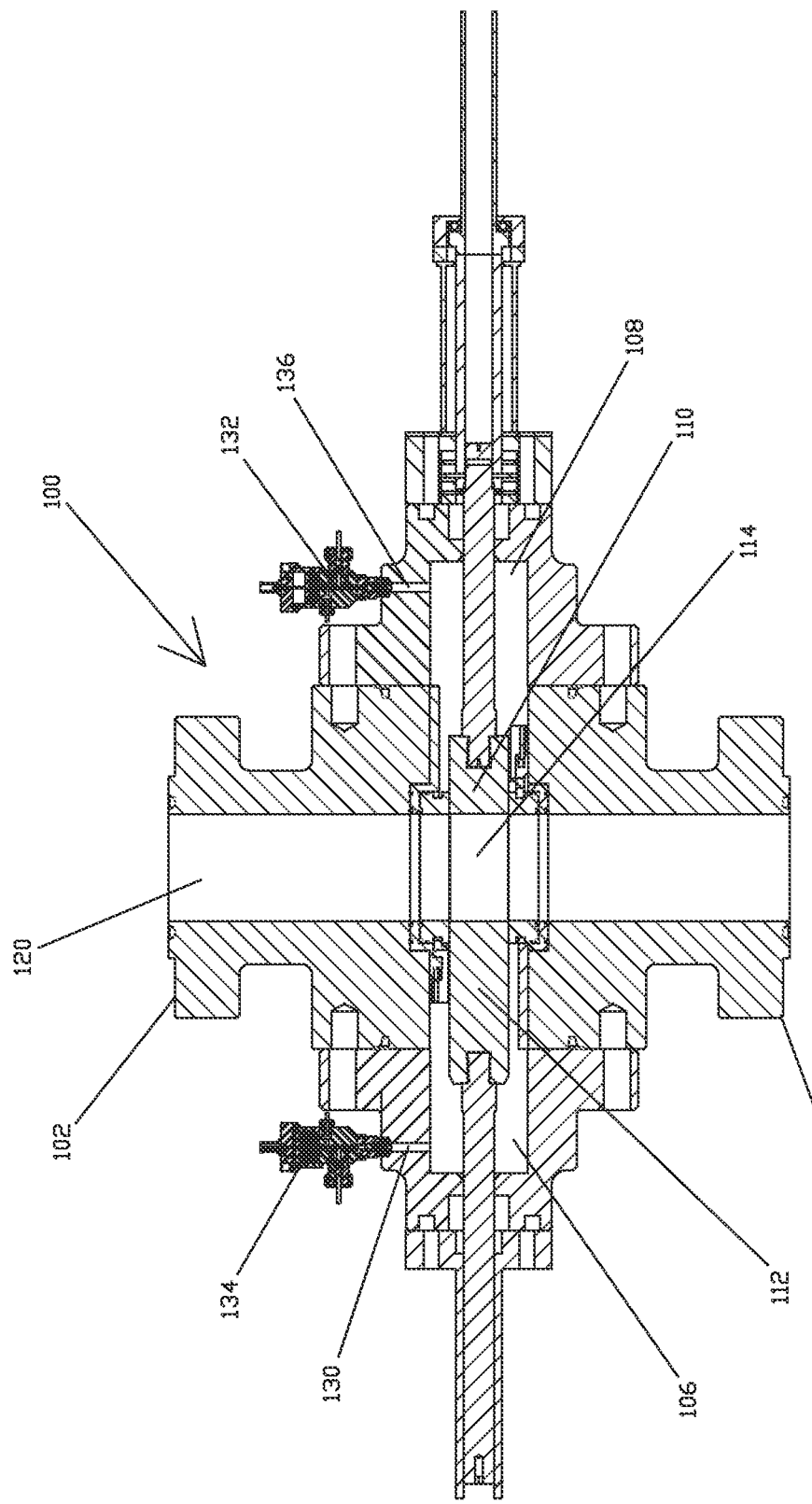
FIG. 2 is a side view of a gate valve having a check valve bleed assembly where the gate allows fluid access through the gate valve throughbore.

In order to shift the gate valve 100 from the currently shown closed condition the gate 110 must be shifted such that the blocking portion 110 no longer sits across throughbore 120 and that open portion 114 is aligned with the throughbore 120 allowing fluid access between the upper portion 102 of gate valve 100 and the lower portion 104 of gate valve 100 as is shown in FIG. 2.

FIG. 2 depicts the gate valve 100, from FIG. 1, with the gate 110 shifted so that open portion 114 is aligned with the throughbore 120 allowing fluid access between the upper end 102 of gate valve 100 and the lower end 104 gate valve 100. The gate 110 has been shifted such that blocking portion 112 of the gate 110 is within the $1^{st}$ cavity 106. However, the $1^{st}$ cavity 106 is filled with grease which is an incompressible fluid therefore prior to shifting the gate 110 into the $1^{st}$ cavity 106 a provision must be made for the grease to exit the $1^{st}$ cavity 106 either prior to or as the blocking portion 112 of the gate 110 shifted into the $1^{st}$ cavity 106. In most instances as the blocking portion 112 of the gate 110 is shifted into the $1^{st}$ cavity 106 a like amount of grease is displaced from the $1^{st}$ cavity 106 through port 130.

In most instances when the throughbore 120 is pressurized, usually with fracking fluid, all fluid ports that provide a fluid path to the throughbore 120 must be sealed. In order to seal bleed ports 130 and 132 generally a check valve bleed assembly such as check valve bleed assemblies 134 and 136 are affixed, usually by threads, into bleed ports 130 and 132. Check valve bleed assemblies 134 and 136 include a check valve that remains closed unless the check valve bleed assembly is actuated.

Figure 3:
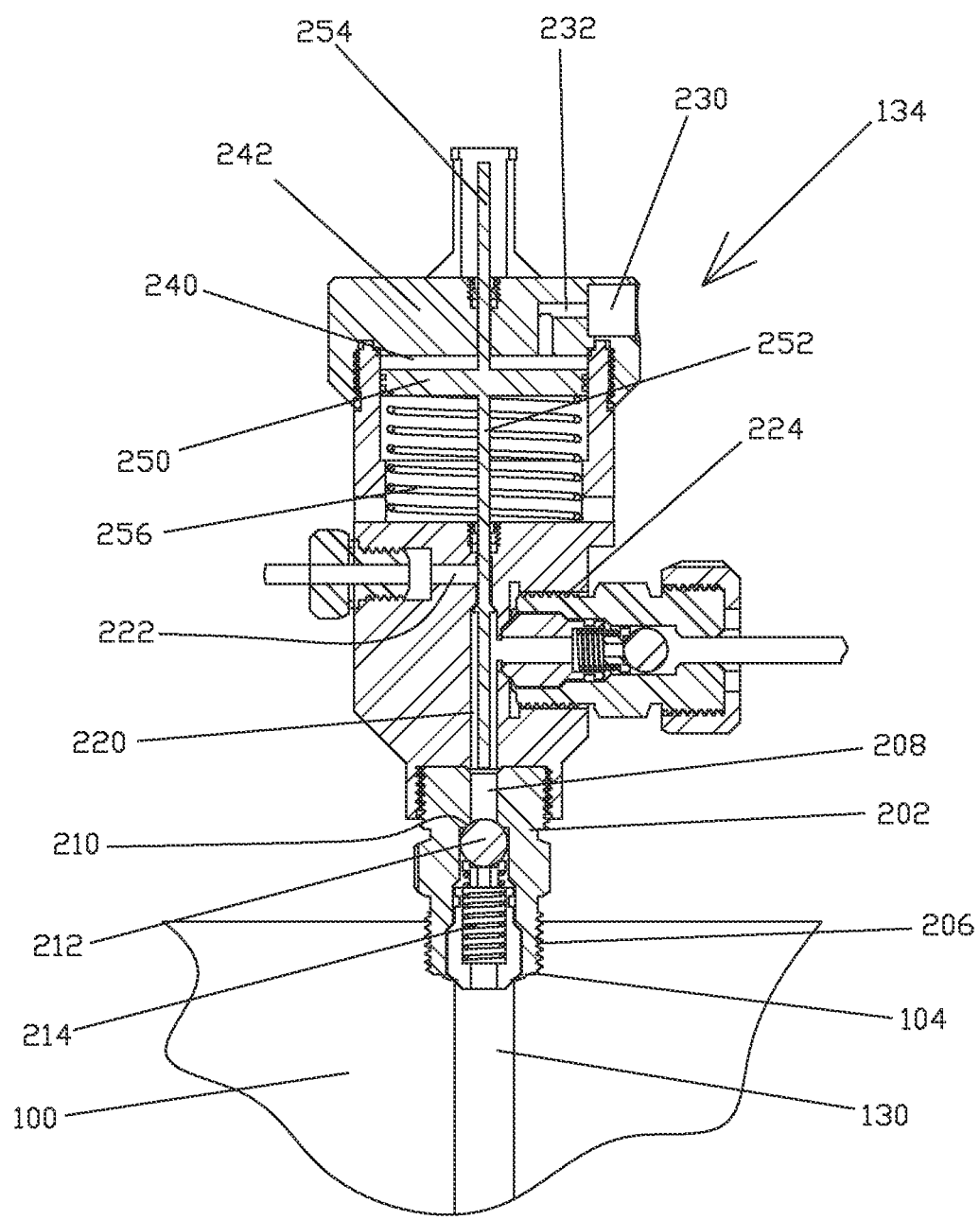
FIG. 3 is a side view of a check valve bleed assembly having a closed fluid flow path through the check valve bleed assembly.

FIG. 3 is a check valve bleed assembly 134 and it's normally an actuated state. The check valve bleed assembly 134 includes at least a $1^{st}$ check valve 202. At the lower end 204 of the check valve 202 are threads 206 which may be threaded into port 130. The check valve 202 generally includes a seat 210, a ball 212, and a biasing device such as a spring 214. The spring 214 provides a force to push the ball 212 into the seat 210. As fluid from bleed port 130 proceeds into the check valve 210 the fluid will act upon the ball 212 to add additional force to the spring 214 to push the ball 212 into the seat 210. At the upper end of the check valve is port 208. Port 208 provides fluid access to passageway 220. Passageway 220 in turn is fluidly connected to port 222 and port 224.

The check valve bleed assembly 134 also has a port 230. Port 230 is fluidly connected to chamber 240 by passageway 232. In this instance the fluid may be a gas or a liquid such as hydraulic fluid within chamber 240 is piston 250. Piston 250 has a lower rod 252 that extends into passageway 220. In some instances piston 250 has an upper rod 254 that extends through cap 242 to the exterior of the check valve bleed assembly 134. Within chamber 240 and below piston 250 is a piston biasing device 256, in this instance a spring. In other instances the piston biasing device 256 may be a compressible fluid or gas such as nitrogen. In certain instance rod 254 may be used to indicate the position of the check valve, ie whether the ball 312 is off of the seat 310 and open or the ball 312 is on the seat 310 and closed.

When not actuated spring 256 pushes piston 250 towards the upper end of chamber 240 thereby moving lower rod 252 out of contact with ball 212. With lower rod 250 removed from contact with ball 212 biasing device 214 may push valve 212 into contact with seat 210 and with any additional fluid pressure from within bleed port 130 seals in the pressure within bleed port 130. In certain instances the lower rod 252 may remain in contact with ball 212 relying upon biasing device 214 to provide sufficient force to move ball 212 into contact with seat 210 despite the added resistance of lower rod 252, piston 250, and any fluid within chamber 240 above piston 250.

Figure 4:
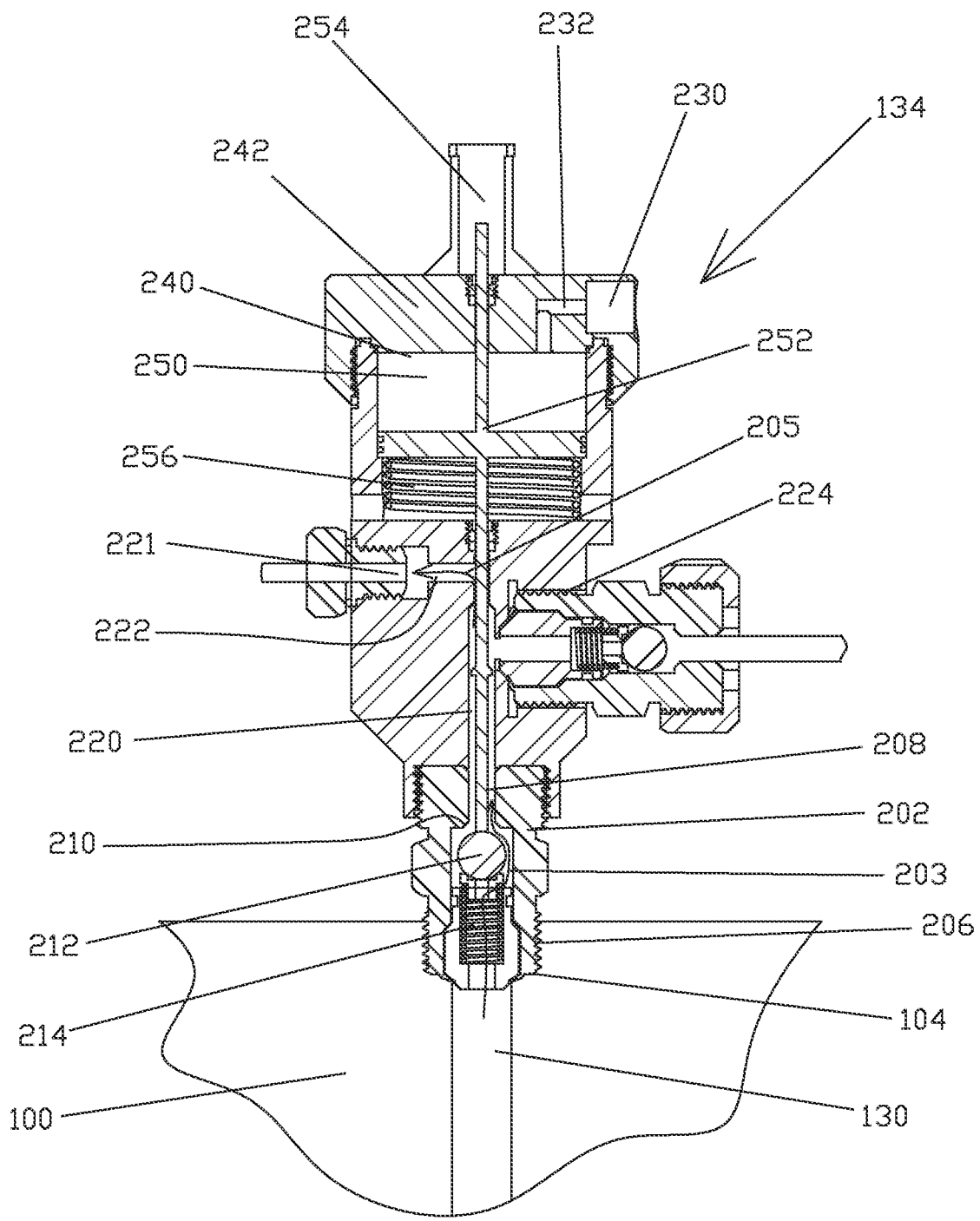
FIG. 4 is a side view of a check valve bleed assembly having an open fluid flow path through the check valve bleed assembly.

FIG. 4 depicts the check valve bleed assembly 134 in its actuated condition. Fluid pressure is provided through port 230, into passageway 232, and then into chamber 240 the fluid pressure acts upon piston 250 and provides sufficient force to move the piston 250 downwards in opposition to the piston biasing device 256. As the piston 250 moves downwards rod 252 is also forced downwards and into contact with ball 212. Ball 212 is also forced downwards in opposition to biasing device 214. As ball 212 is forced downwards it no longer contacts seat 210 thereby opening a fluid passageway. Any grease or other fluid within bleed port 130 may then move from bleed port 130 into check valve 202, around ball 212, into passageway 220, further moving up passageway 220 where it enters port 222 exiting the check valve bleed assembly 134 into a waste tube 221 as indicated by arrow 203 and 205.

Figure 5:
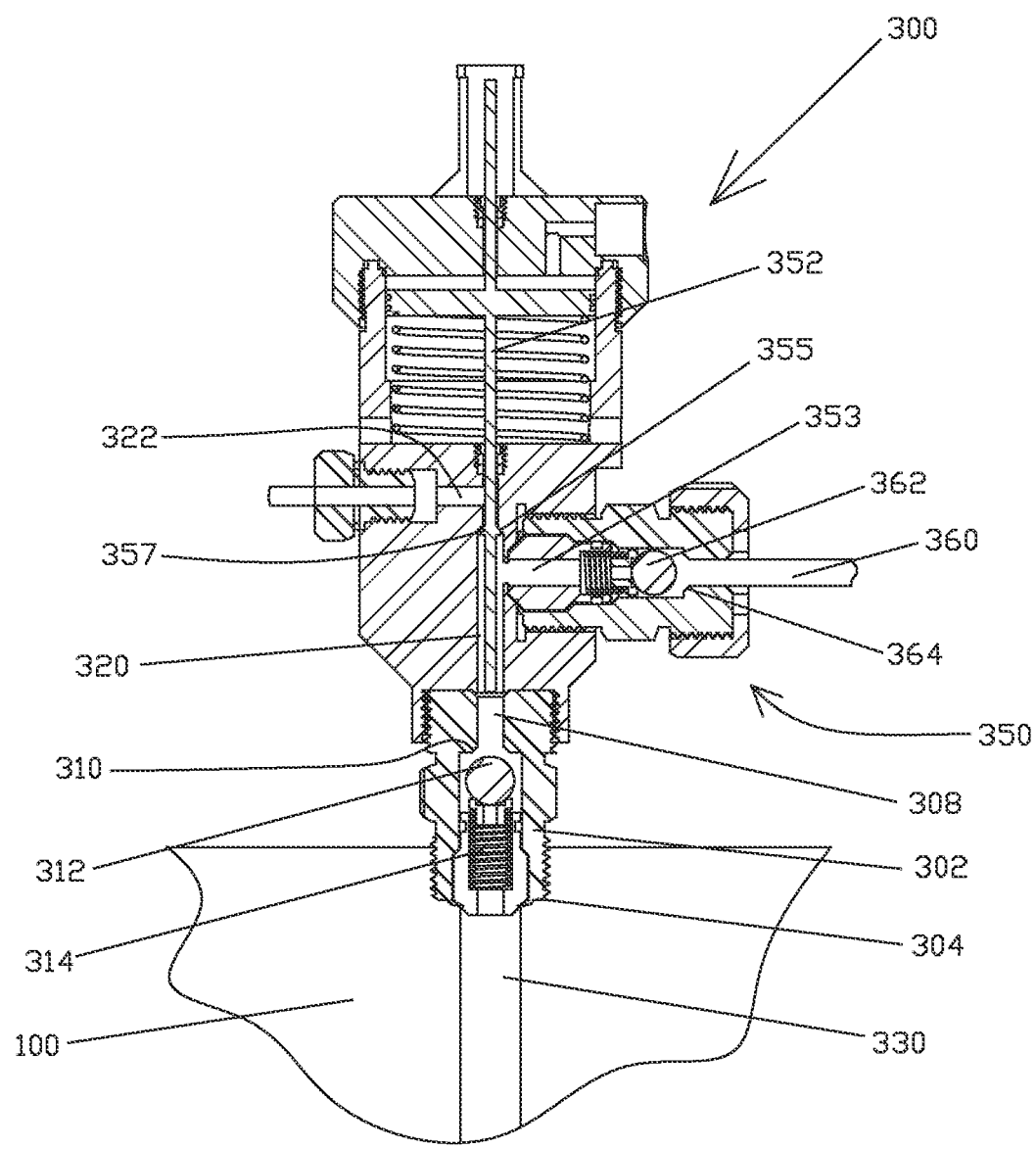
FIG. 5 is a side view of a check valve bleed assembly having an open grease injection flow path through the check valve bleed assembly.

FIG. 5 is an alternative arrangement of a check valve bleed assembly 300 that includes a grease injection system 350. The check valve bleed assembly 300 includes at least a $1^{st}$ check valve 302. At the lower end 304 of the check valve 302 are threads 306 which may be threaded into port 330. The check valve 302 generally includes a seat 310, a ball 312, and a biasing device such as a spring 314. The spring 314 provides a force to push the ball 312 into the seat 310. At the upper end of the check valve is a port 308. Port 308 provides fluid access between passageway 320 and port 330. Passageway 320 in turn is fluidly connected to port 353. Within passageway 320 is a seat 355. Rod 352 is within passageway 320 and includes a shoulder 357. Generally, when the check valve bleed assembly 300 is not actuated shoulder 357 will contact seat 355 and act as a check valve preventing fluid from proceeding through passageway 322 port 322. In general any check valve could be placed at the location of the seat and rod shoulder assembly provided that force could be applied thought the assembly from the rod above to another rod below in order to move the ball 312 off of the seat 310 when required.

Generally, when the grease injection system 350 is actuated grease is supplied through tube 360. The high-pressure grease applies force to the ball 362 and moves ball 362 off of seat 364. With the ball 362 displaced from seat 364 the grease can move from tube 360 around ball 362 and into port 353. The grease then moves from port 353 in the passageway 320. Seat 355 and shoulder 357 act as a check valve to prevent grease from moving further up in passageway 320 towards port 322. Grease moves from passageway 320 into passageway 308 within check valve 302 where again the grease supply sufficient pressure to force ball 312 off of seat 310. The grease is then able to flow around ball 312 through check valve 302 into bleed port 330 and finally into a $1^{st}$ or $2^{nd}$ cavity within a gate valve.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A gate valve bleed system comprising:
a gate valve having a bleed port;
a fluid flow path from the bleed port to a waste collection port;
a second fluid flow path from a grease injection port to the bleed port;
a first check valve;
wherein the first check valve prevents fluid flow from the bleed port past the first check valve when the first check valve is closed;
a second check valve in the second fluid flow path preventing fluid flow past the second check valve when the second check valve is closed; and
a third check valve in the first fluid flow path between the waste collection port and the second fluid flow path;
wherein grease flowing into the second fluid flow path from an exterior of the gate valve opens the first and second check valves while closing the third check valve.

* * * * *